US009341800B2

(12) United States Patent
Montalvo Urbano et al.

(10) Patent No.: US 9,341,800 B2
(45) Date of Patent: May 17, 2016

(54) MODULAR OPTICAL FIBER DISTRIBUTION HUB WITH MULTI-ROW SPLITTER MODULE MOUNTING STRUCTURE

(71) Applicant: CORNING OPTICAL COMMUNICATIONS LLC, Hickory, NC (US)

(72) Inventors: Adriana Montalvo Urbano, Tamaulipas (MX); Sergio Sanchez Garcia, Tamaulipas (MX)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/793,162

(22) Filed: Jul. 7, 2015

(65) Prior Publication Data

US 2016/0011391 A1    Jan. 14, 2016

Related U.S. Application Data

(60) Provisional application No. 62/022,406, filed on Jul. 9, 2014.

(51) Int. Cl.
*G02B 6/00* (2006.01)
*G02B 6/44* (2006.01)
*H04Q 1/14* (2006.01)
*G02B 6/38* (2006.01)

(52) U.S. Cl.
CPC ............ *G02B 6/4452* (2013.01); *G02B 6/4454* (2013.01); *H04Q 1/14* (2013.01); *G02B 6/3897* (2013.01); *G02B 6/4471* (2013.01)

(58) Field of Classification Search
CPC .... G02B 6/3849; G02B 6/3897; G02B 6/445; G02B 6/4452; G02B 6/4454; G02B 6/4471; H04Q 1/114; H04Q 1/021; H04Q 1/14
USPC .................................... 385/53, 134–137, 139
See application file for complete search history.

(56) References Cited

U.S. PATENT DOCUMENTS

| 6,983,095 | B2 * | 1/2006 | Reagan ................ G02B 6/4452 385/135 |
| 8,606,067 | B2 * | 12/2013 | Solheid ................ G02B 6/4442 385/135 |
| 2005/0281526 | A1 | 12/2005 | Vongseng et al. | |
| 2009/0110359 | A1 * | 4/2009 | Smith .................... G02B 6/445 385/135 |
| 2014/0050451 | A1 | 2/2014 | Reagan et al. ................ 385/135 |

OTHER PUBLICATIONS

Patent Cooperation Treaty International Search Report, Application No. PCT/US2015/039340, Dec. 18, 2015, 6 pages.

* cited by examiner

*Primary Examiner* — Akm Enayet Ullah
*Assistant Examiner* — Michael Mooney

(57) ABSTRACT

A modular optical fiber distribution housing is provided. The housing includes a first row of splitter modules and a second row of splitter modules both supported from the inner surface of one of the plurality of walls, and each splitter module is receives an input optical fiber and includes a splitting device configured to split a signal carried by the received input optical fiber into a plurality of signals carried by respective output optical fibers. The first row of splitter modules is located between the second row of splitter modules and the inner surface of the wall supporting the first and second rows of splitter modules.

20 Claims, 5 Drawing Sheets

MODULAR OPTICAL FIBER DISTRIBUTION HUB WITH MULTI-ROW SPLITTER MODULE MOUNTING STRUCTURE

RELATED APPLICATIONS

This application claims the benefit of priority under 35 U.S.C. §119 of U.S. Provisional Application No. 62/022,406 filed on Jul. 9, 2014, the content of which is relied upon and incorporated herein by reference in its entirety.

BACKGROUND

1. Field

The disclosure relates generally to fiber optic networks and more particularly to equipment housings for use within fiber optic networks.

2. Technical Background

Within a fiber optic network, various upstream or input fibers carry optical signals including data to be delivered to multiple downstream users or customers. In some fiber optic networks, a splitting device in a splitter module receives an input optical fiber from a service provider and splits the optical signal carried by the input optical fiber into a plurality of optical signals carried by respective output optical fibers that each distributes to the appropriate subscriber or downstream user. A fiber distribution hub or cabinet provides the housing and support for the splitter modules, the input fibers, the output fibers, the splicing hardware, etc. that operates to delivering data service to the network of an end user.

SUMMARY

One embodiment of the disclosure relates to a modular optical fiber distribution housing. The housing includes a plurality of walls, and each of the plurality of walls include inner surfaces that together define an interior compartment of the housing. The housing includes a first row of splitter modules supported from the inner surface of one of the plurality of walls, and each splitter module of the first row is configured to receive an input fiber and split a signal from the received input fiber into a plurality of output fibers. The housing includes a second row of splitter modules supported from the same inner surface of one of the plurality of walls as the first row of splitter modules, and each splitter module of the second row is configured to receive an input fiber and split a signal from the received input fiber into a plurality of output fibers. The first row of splitter modules is located between the second row of splitter modules and the inner surface of the wall supporting the first and second rows of splitter modules.

An additional embodiment of the disclosure relates to a modular fiber distribution cabinet. The cabinet includes a plurality of walls, each of the plurality of walls including inner surfaces that together define an interior compartment of the cabinet. The cabinet includes a splitter module support system configured to support multiple rows of splitter modules along the inner surface of one of the plurality of walls. The splitter module support system includes a plurality of support brackets. The support brackets include a back wall, a pair of arms extending from opposing lateral edges of the back wall, a bracket tab extending from each arm, and a support opening formed through the back wall. The splitter module support system includes a mounting plate that includes a first array of openings extending through the mounting plate and a second array of openings extending through the mounting plate. Each opening of the first array of openings is configured to engage a tab of a splitter module such that the splitter modules engaged with the first array of openings are supported from the mounting plate in a first row. The bracket tabs of each arm of each support bracket are configured to engage an opening of the second array of openings such that each support bracket is supported from the mounting plate. The support opening of each support bracket is configured to engage a tab of a splitter module such that the splitter modules engaged with the support openings are supported from the support bracket in a second row.

An additional embodiment of the disclosure relates to a splitter module support system configured to support multiple rows of splitter modules along an inner surface of a fiber distribution cabinet. The splitter module support system includes a plurality of support brackets and a mounting plate. Each support bracket includes a back wall having an upper edge, a lower edge, a left edge, a right edge, a front surface and rear surface. Each support bracket includes a first arm extending from the left edge of the back wall away from and substantially perpendicular to the front surface of the back wall and a second arm extending from the right edge of the back wall away from and substantially perpendicular to the front surface of the back wall. Each support bracket includes an upper support opening formed through the back wall extending in a direction from the left edge toward the right edge of the back wall and located vertically between the upper edge of the back wall and a midpoint of the back wall. The mounting plate includes an upper edge, a lower edge and a horizontal middle axis located equidistance from the upper edge and the lower edge. The mounting plate includes a first array of openings through the mounting plate extending across at least a portion of the mounting plate and located vertically between the upper edge and the horizontal middle axis. The mounting plate includes a second array of openings through the mounting plate located below the first array of openings. Each opening of the first array of openings is configured to engage an upper tab of a splitter module such that the splitter modules engaged with the first array of openings are supported from the mounting plate in a first row. The first and second arms of each support bracket are each configured to engage a separate opening of the second array of openings such that each support bracket is cantilevered from the mounting plate. The upper support opening of the support bracket is configured to engage an upper tab of a splitter module such that the splitter modules engaged with the upper support opening of the support bracket are supported from the rear surface of the support bracket.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of a modular fiber distribution housing or cabinet including a splitter module support system are shown. In general, the modular fiber distribution housing and splitter module support system are configured to allow the modular fiber distribution housing to support a large number of splitter modules within an interior compartment of the housing without the need to increase the overall volume or footprint of the housing. In various embodiments, the dense arrangement of splitter modules is provided by a support system that supports splitter modules in multiple rows cantilevered from an inner surface of the housing. In various embodiments, this arrangement allows for a larger number of splitter modules to be supported within a housing of set size than at least some typical splitter module mounting arrangements. In addition, the splitter module support system is configured to allow the user of the modular fiber distribution housing to add or remove splitter modules from the housing without the need to use tools to couple or decouple splitter modules from the housing.

Figure 1:
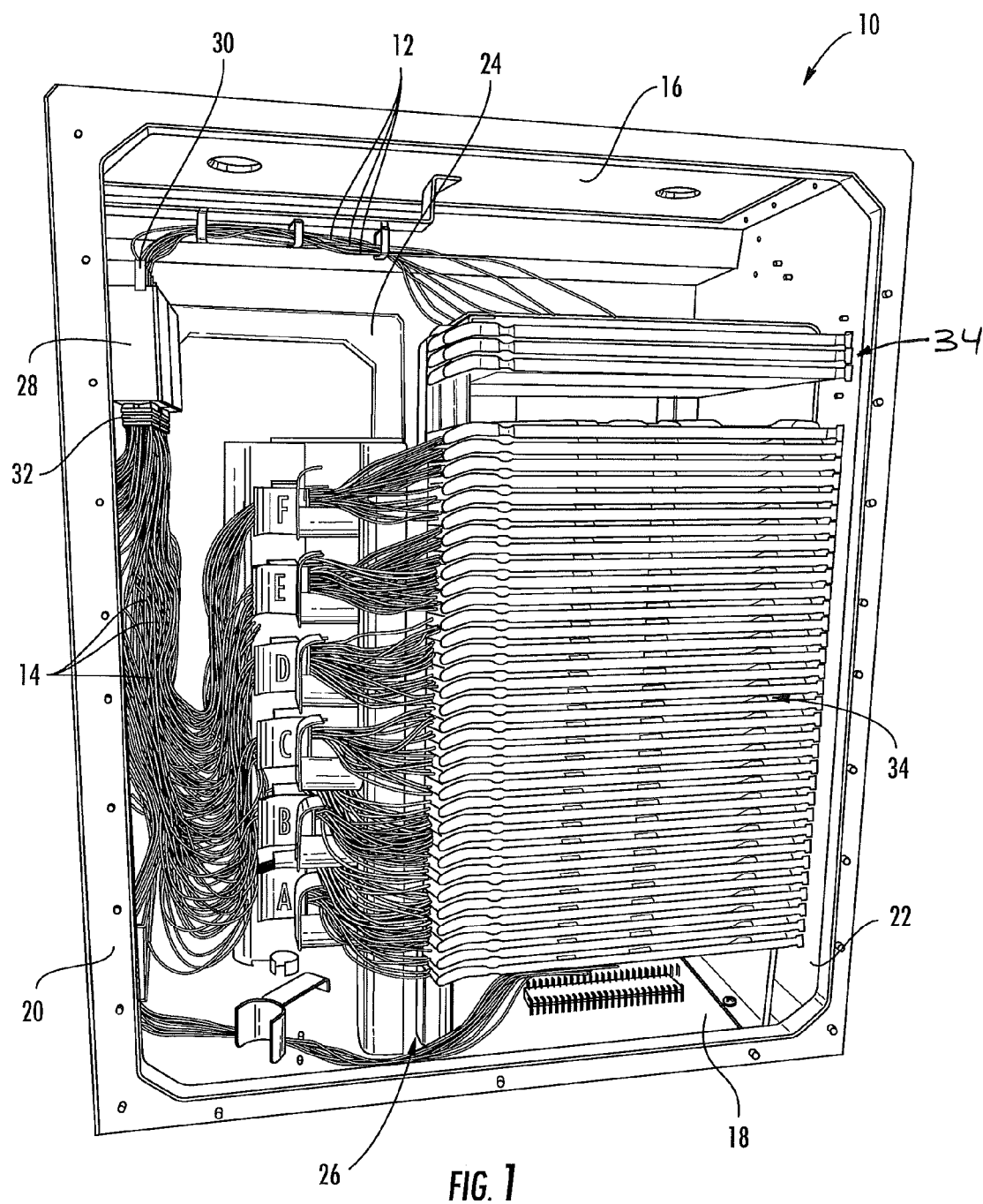
FIG. 1 is a perspective view of a modular fiber distribution cabinet according to an exemplary embodiment.

Referring to FIG. 1, a modular fiber distribution hub or housing, shown as fiber distribution cabinet 10, is shown according to an exemplary embodiment. In general, cabinet 10 provides a housing and structure for receiving optical signals carried by optical fibers in fiber optic cable from a point upstream of the cabinet 10 and from a service provider, for splitting the optical signal into multiple output signals and for distributing the split optical signals to the optical network downstream of the cabinet 10 and to subscribers. In general, cabinet 10 includes an upper wall 16, a lower wall 18, a left sidewall 20, a right sidewall 22 and rear wall 24, and cabinet 10 will include a front wall or door which is removed in FIG. 1 to show the interior of cabinet 10. The inner surfaces of the walls of cabinet 10 define an interior compartment 26 sized to hold the various components of cabinet 10 discussed herein.

Cabinet 10 includes a plurality of splitter modules 28 located within interior compartment 26 of cabinet 10. In general, splitter modules 28 contain a splitting device and include an input port 30 through which input optical fibers 12 enter the splitter module 28 and an output port 32 through which one or more output fibers 14 exit the splitter module 28. The input optical fiber 12 may extend from splice cassette 34 where it was optically coupled to an optical fiber from a fiber optic cable entering cabinet 10 from a service provider located upstream of the cabinet 10 in the fiber optic network. At least some of output fibers 14 extend from splitter modules 28 to one or more splice cassettes 34, where it may be coupled to a fiber optic cable extending downstream from the cabinet 10 toward a subscriber so as to provide communication service from the service provider to the particular subscriber. The splitting device in the splitter modules 28 splits optical signals carried by the input fiber 12 into one or more output signals to be carried by output fibers 14.

In various embodiments, splitter module 28 can be a wide variety of splitter modules. In one embodiment, each splitter module 28 is a 1×32 splitter module configured to distribute signals from a single input fiber 12 to up to 32 output fibers 14. In another embodiment, each splitter module 28 is a dual 1×16 splitter module configured to distribute signals from two input fibers 12 to up to 32 output fibers 14. In another embodiment, each splitter module 28 is a dual 1×8 splitter module configured to distribute signals from a two input fibers 12 to up to 16 output fibers 14. In another embodiment, each splitter module 28 is a 1×64 splitter module configured to distribute signals from a single input fiber 12 to up to 64 output fibers 14. In various specific embodiments, splitter modules 28 are LS Series splitter modules available from Corning Optical Communications LLC.

Figure 2:
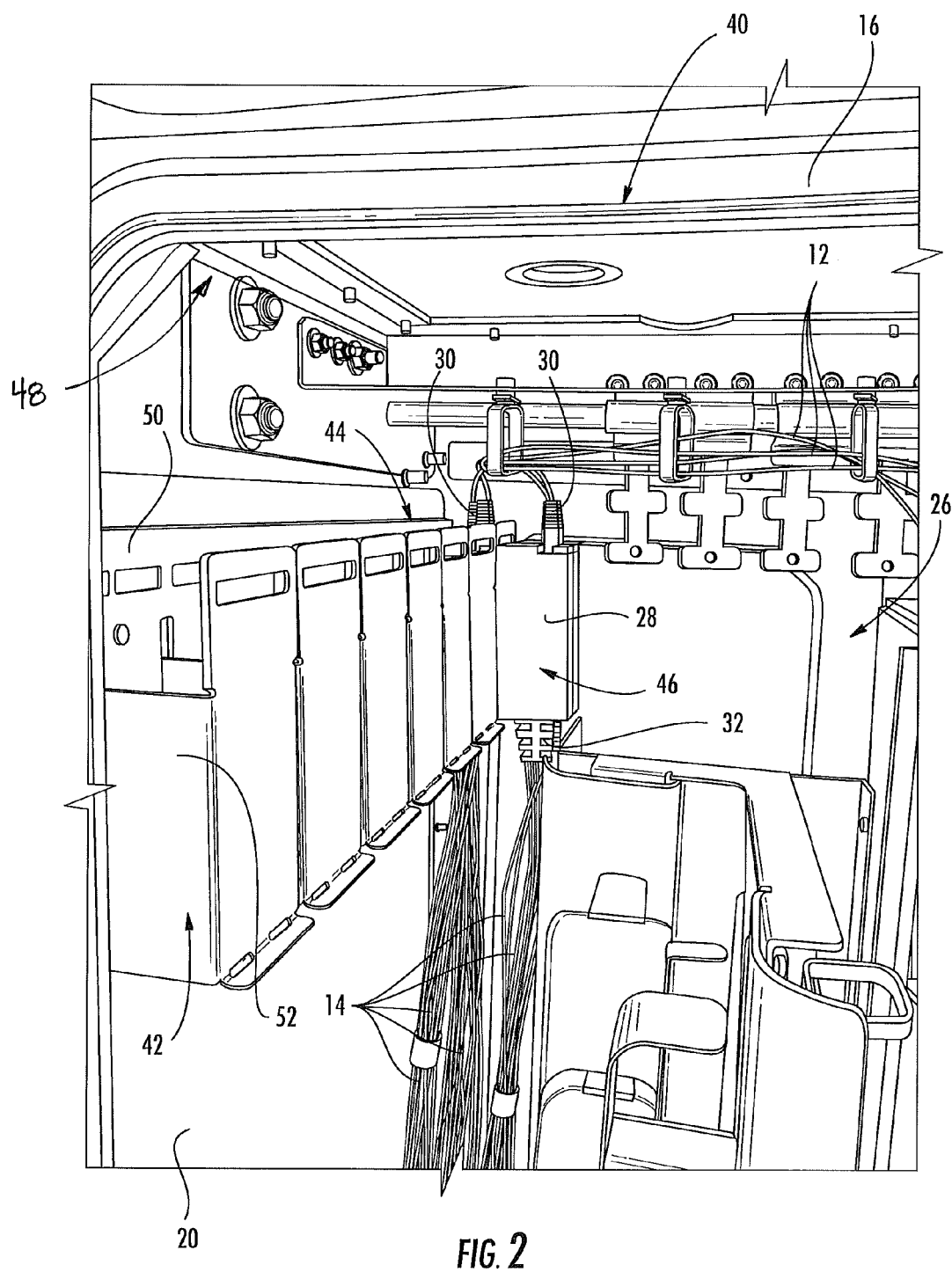
FIG. 2 is a perspective view of a portion of the modular fiber distribution cabinet of FIG. 1 showing a splitter module support system according to an exemplary embodiment.

Referring to FIG. 2, a detailed view of a splitter module support area 40 of cabinet 10 is shown according to an exemplary embodiment. In the embodiment shown, cabinet 10 includes a splitter module support system 42. In general, splitter module support system 42 is configured to support two or more rows of splitter modules 28 from the inner surface of one of the walls of cabinet 10. In the embodiment shown, splitter module support system 42 is configured to support splitter modules 28 in two rows, shown as first row 44 and second row 46, from the inner surface of left sidewall 20. In various other embodiments, support system 42 may be configured to support rows of splitter modules from any of the walls of cabinet 10, and may be configured to support three, four or more rows of splitter modules 28.

Support system 42 is configured to support splitter modules 28 cantilevered from the inner surface of sidewall 20 such that first row 44 is located between the inner surface of sidewall 20 and second row 46. In this arrangement, the perpendicular distance from the inner surface of sidewall 20 to a point on the splitter modules 28 of first row 44 (e.g., a midpoint, ports 30, 32, etc.) is less than the perpendicular distance from the inner surface of sidewall 20 to the corresponding point on the splitter modules 28 of second row 46.

In the embodiment shown, support system 42 is located adjacent to one of the corners of cabinet 10, and in the specific embodiment, support system 42 is located adjacent to the upper left-hand corner of cabinet 10. In various embodiments, a corner 48 is formed between left sidewall 20 and upper wall 16. In such embodiments, support system 42 is located less than half of the vertical distance from corner 48 to the vertical midpoint of sidewall 20. In this arrangement, splitter modules 28 are positioned such that input fibers 12 can be coupled to splitter modules 28 without the need for input fibers 12 to traverse significant portions of interior compartment 26.

In various embodiments, support system 42 is configured to support a relatively large number of splitter modules within a cabinet 10 having a relatively small internal volume or a relatively small foot print. In various embodiments, support system 42 is configured to support multiple rows of splitter modules 28, as a non-limiting example, two rows of at least eight splitter modules 28 each. In a specific embodiment, support system 42 is configured to support two rows of at least ten splitter modules 28 each. In a more specific embodiment, support system 42 is configured to support two rows of up to fourteen splitter modules 28 each. In such embodiments, the volume of internal compartment 26 is less than may typically be required to support this large number of splitter modules 28. In exemplary embodiments, the volume of internal compartment 26 is less than 30,000 cubic inches, specifically is less than 25,000 cubic inches and more specifically is less than 23,500 cubic inches. In one such embodiment, cabinet 10 has a height of 46 inches, a width of 26 inches and a depth of 19.3 inches.

Figure 3:
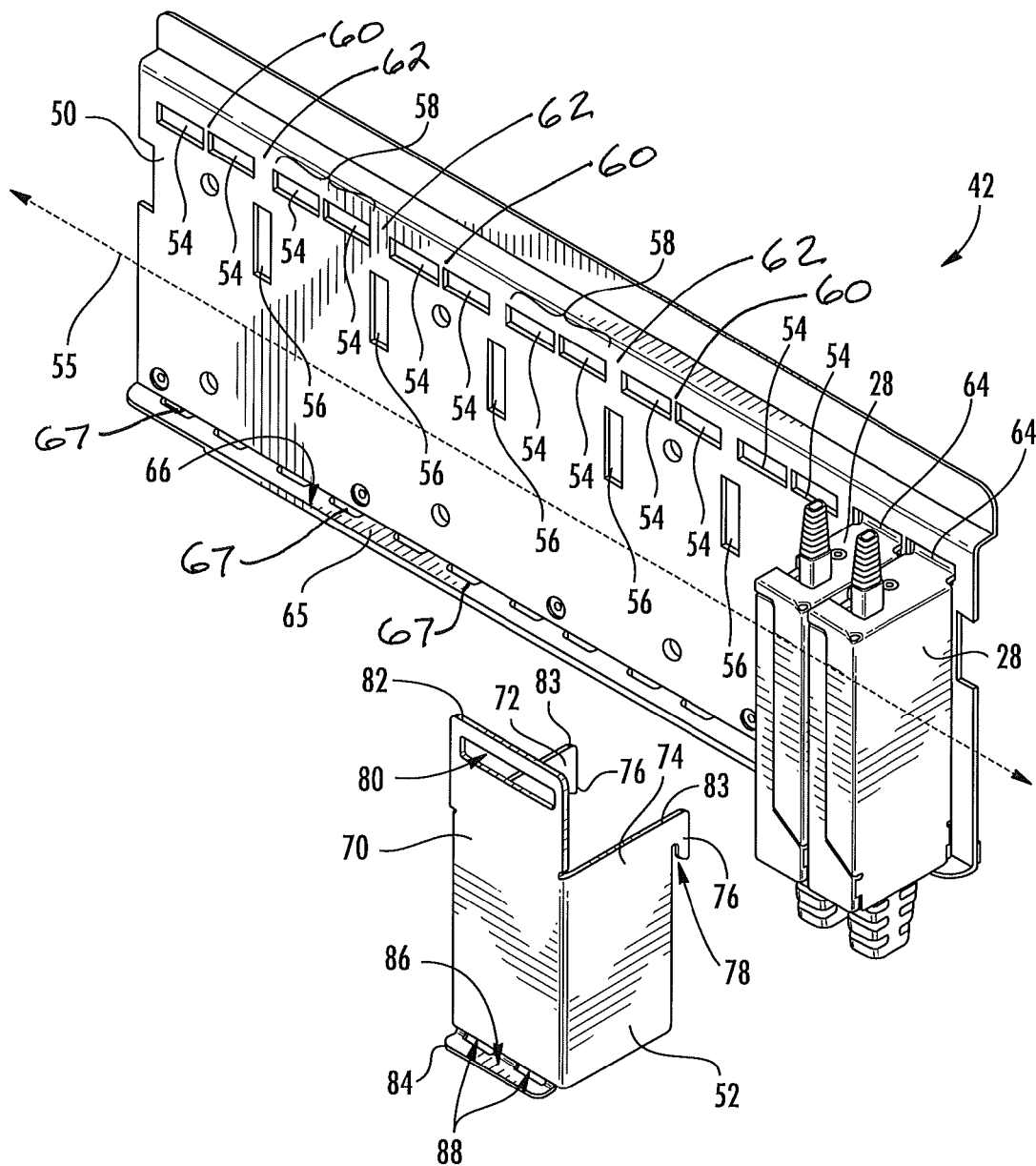
FIG. 3 is a perspective view of a splitter module support system showing splitter modules of a first row coupled to a support plate according to an exemplary embodiment.
Figure 4:
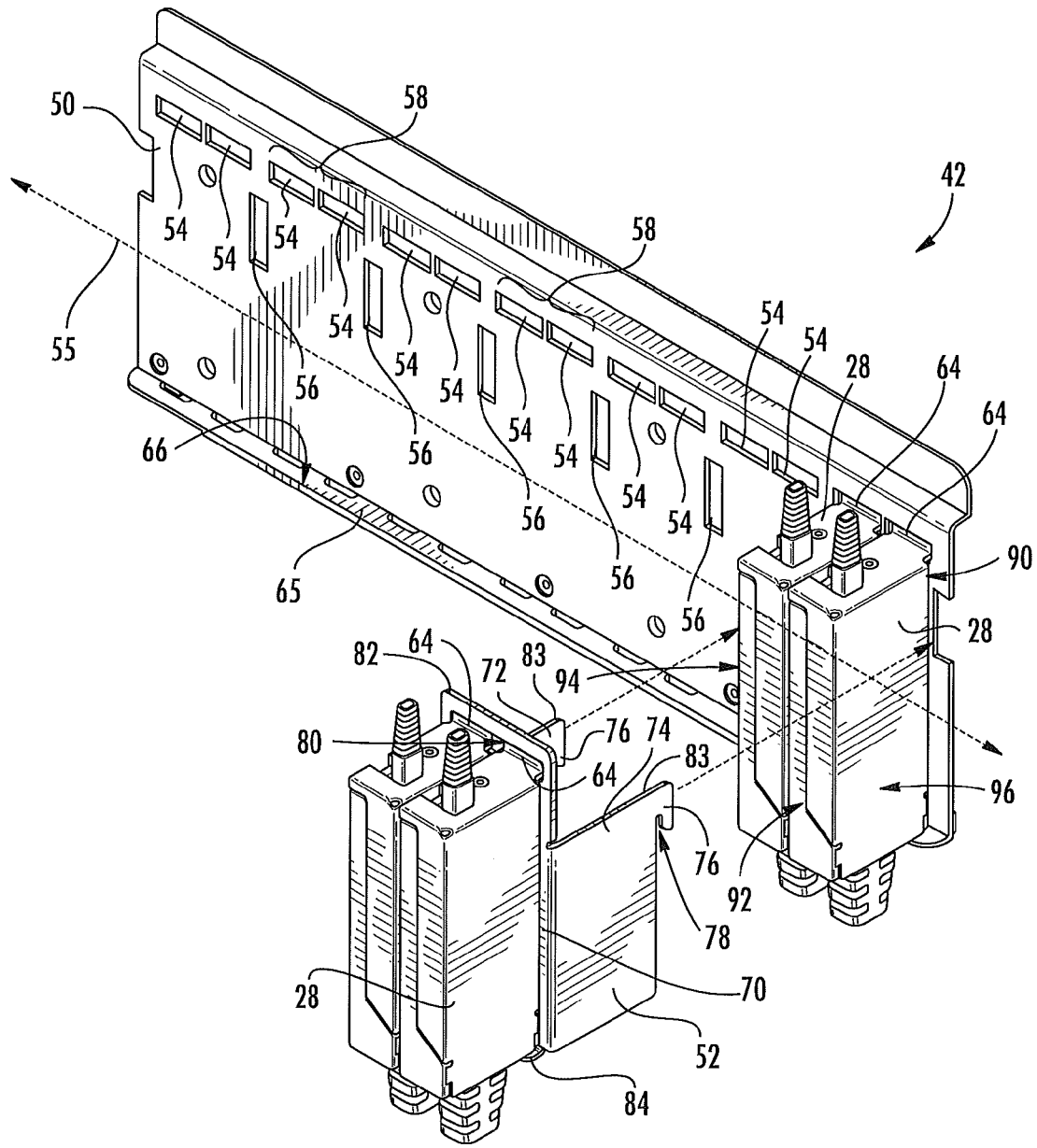
FIG. 4 is a perspective view of a splitter module support system showing splitter modules of a second row supported by a support bracket according to an exemplary embodiment.
Figure 5:
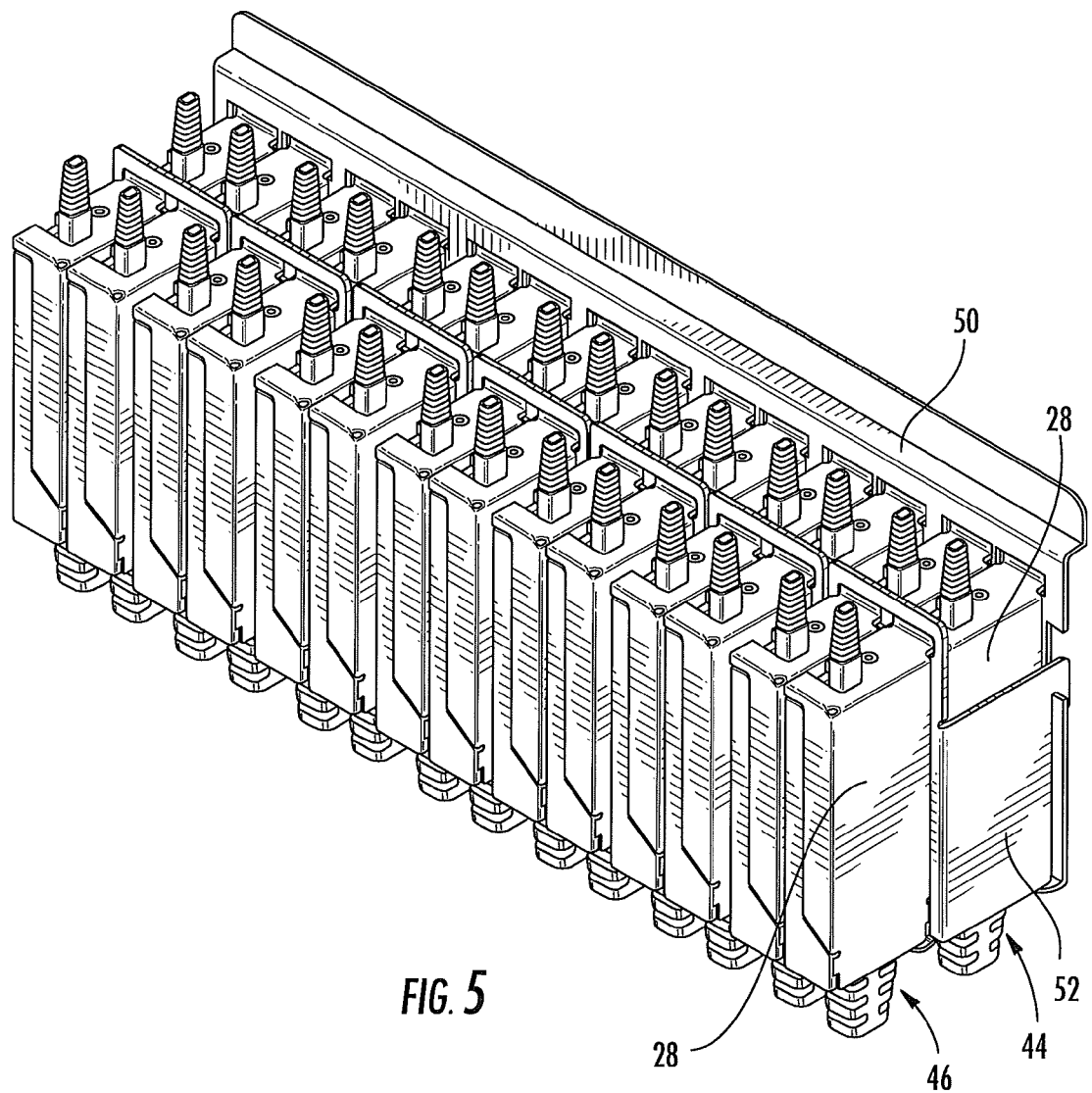
FIG. 5 is a perspective view of a splitter module support system showing splitter modules supported in first and second rows according to an exemplary embodiment.

Referring to FIGS. 3-5, splitter module support system 42 is shown according to an exemplary embodiment. In general, splitter module support system 42 includes a mounting plate, shown as plate 50, and at least one support bracket, shown as bracket 52. Plate 50 includes a first array of support openings, shown as openings 54, and a second array of support openings shown as openings 56. In general, plate 50 is configured to be coupled to the inner surface of one of the walls of cabinet 10, and openings 54 are configured to engage one or more splitter modules 28 such that the splitter modules 28 engaged with openings 54 form first row 44 of splitter modules shown in FIG. 2. Brackets 52 are configured to engage openings 56 of plate 50 such that each bracket 52 is cantilevered from plate 50, and brackets 52 are configured to engage one or more splitter modules 28 such that the splitter modules 28 engaged with bracket 52 form second row 46 of splitter modules. Thus, in this arrangement, second row 46 of splitter modules is supported from the wall of cabinet 10 via the engagement between bracket 52 and plate 50.

Referring to the exemplary embodiment as shown in FIG. 3 and FIG. 4, openings 54 are generally horizontally positioned rectangular openings that are spaced from each other horizontally along the length of plate 50. In the exemplary embodiment shown, openings 54 are generally located vertically below an upper edge of plate 50 and above a horizontal midline 55 of plate 50.

Openings 54 are grouped into a repeating pattern of two or more opening groups 58 in which a portion 60 of plate 50 is located between the openings 54 within the group 58 and a portion 62 of plate 50 is located between the last opening 54 of one group 58 and the first opening 54 of the next adjacent group 58. In this embodiment, the width of portion 60 is less than the width of portion 62, and this spacing between opening groups 58 allows room for brackets 52 to engage plate 50.

In various embodiments, splitter modules 28 include one or more upper support tabs 64. As shown in FIG. 3, upper tabs 64 are received through openings 54 such that splitter modules 28 of first row 44 are supported from plate 50. In various embodiments, plate 50 includes a lower ledge or rim 65 that engages and supports a lower surface of splitter module 28. In the embodiment shown, rim 65 extends out from the side of plate 50 opposite wall 20 and has a substantially upward facing horizontal surface 66 that engages the lower surface of splitter module 28. In addition, upward facing horizontal surface includes one or more lower support openings 67 formed at least partially through rim 65, and in such embodiments, splitter modules 28 may include lower support tabs that are received within lower support openings 67 to further couple and support splitter modules 28 from plate 50.

Still referring to the exemplary embodiment of FIG. 3, openings 56 are generally vertically positioned rectangular openings. Openings 56 are spaced from each other horizontally at regular intervals along the length of plate 50. In the exemplary embodiment shown, openings 56 are generally located vertically below openings 54 such that openings 56 are located between a horizontal midline 55 of plate 50 and openings 54. In the specific embodiment shown, openings 56 are located directly below plate portions 62 that are located between opening groups 58.

As shown in the exemplary embodiment of FIG. 3, there are more openings 54 than there are openings 56. In one embodiment, plate 50 includes at least ten openings 54 and at least five openings 56. In one embodiment, the number of openings 56 is one half of the number of openings 54 plus one. In a specific embodiment, plate 50 includes fourteen openings 54 and eight openings 56.

Referring to FIG. 3 and FIG. 4, bracket 52 is structured to both engage plate 50 and to support second row 46 of splitter modules 28 adjacent to first row 44 of splitter modules 28 within cabinet 10. Bracket 52 includes a back wall 70, a first arm, shown as sidewall 72, extending from a left side of back wall 70 and a second arm, shown as sidewall 74, extending from a right side of back wall 70. In an exemplary embodiment, back wall 70 includes front surface facing plate 50 in the orientation of FIG. 3 and a rear surface opposite the front surface, and sidewalls 72 and 74 extend away from and substantially perpendicular to the front surface of back wall 70 and in a direction toward plate 50. Sidewalls 72 and 74 each include a projecting support hook or tab 76 extending from sidewalls 72 and 74. In the embodiment shown, tabs 76 extend down from the ends of sidewalls 72 and 74 distal from back wall 70. In this arrangement, a gap 78 is formed between each tab 76 and vertical edges of sidewalls 72 and 74 below tabs 76. In various embodiments, to provide for proper alignment with openings 56, tabs 76 are vertically positioned between the upper most edge of back wall 70 and the vertical midpoint of back wall 70.

Referring to FIG. 4 and FIG. 5, to mount bracket 52 to plate 50, sidewalls 72 and 74 and tabs 76, in particular, are each aligned with a pair of adjacent openings 56. Tabs 76 are engaged within openings 56 such that bracket 52 is supported from or cantilevered from plate 50. In this arrangement, one or more splitter modules 28 of first row 44 are received in the space between sidewalls 72 and 74.

In addition to engaging plate 50, bracket 52 includes various structures to support splitter modules 28 from the rear surface of back wall 70 to form second row 46. Referring to FIG. 3, bracket 52 includes an upper support opening 80 formed through back wall 70. In general, upper support opening 80 is configured to engage upper tabs 64 of one or more splitter modules 28 such that splitter modules 28 are supported from the rear surface of back wall 70. In various embodiments, upper support opening 80 is located vertically between upper most edge 82 of back wall 70 and the uppermost edges 83 of sidewalls 72 and 74. In the embodiment shown, opening 80 is in the form of an elongate opening extending horizontally more than 50% of the width of back wall 70. In one such embodiment, opening 80 is substantially rectangular in shape and is substantially parallel to upper edge 82. In other embodiments, opening 80 is an array of multiple openings similar to openings 54.

Bracket 52 includes a lower support wall 84. Lower support wall 84 extends outward from a lower edge of back wall 70, and in the embodiment shown, lower support wall 84 is substantially perpendicular to the rear surface of back wall 70. Similar to rim 65, lower support wall 84 engages and supports a lower surface of splitter module 28. Specifically, support wall 84 includes an upper surface 86 that engages the lower surface of splitter module 28. In addition, bracket 52 includes one or more lower support openings 88 formed at least partially through lower support wall 84, and in such embodiments, splitter modules 28 may include lower support tabs that are received within lower support openings 88 to further couple and support splitter modules 28 from bracket 52.

Referring to FIG. 5, engagement of splitter modules 28 with plate 50 and brackets 52 are shown in detail forming rows 44 and 46. In various embodiments, openings 54, openings 56, support bracket tabs 76, support opening 80 of bracket 52, support plate rim 65 and lower bracket support wall 84 are configured, sized and positioned to arrange rows 44 and 46 in an orderly fashion as shown in FIG. 5. In general, front row 44 and back row 46 of splitter modules are substantially parallel to each other such that the upper planar surfaces of splitter modules 28 of the rows 44 and 46 are substantially coplanar with each other. In various embodiments the upper planar surfaces of splitter modules 28 of the rows 44 and 46 are substantially coplanar when the relative angle between the upper surfaces of different splitter modules 28 is less than 10 degrees and the vertical distance between the upper surfaces of different splitter modules 28 is less than one inch. In addition, with rows 44 and 46 in the parallel arrangement shown in FIG. 5, upper ports 30 and lower connectors 32 are substantially aligned with the corresponding connector of the adjacent splitter module. In one such embodiment, substantially aligned means that a line perpendicular to the inner surface of sidewall 20 intersects both upper ports 30 and/or both lower connectors 32 of adjacent splitter modules 28 between rows 44 and 46. As will be understood in such embodiments, splitter modules 28 within rows 44 and 46 are located at substantially the same height as each other within cabinet.

It will be understood that the relative positioning between the splitter modules 28 of front row 44 and of back row 46 result from the relative positioning of openings 54 and upper support opening 80 of bracket 52. As can be seen in FIG. 5, when bracket 52 is supported from plate 50 via engagement of tabs 76 with openings 56, the height or vertical position of upper support opening 80 of bracket 52 is substantially the same as the height or vertical position of openings 54. Thus, when splitter modules 28 of rows 44 and 46 are engaged with openings 54 and upper support opening 80, respectively, the splitter modules 28 are aligned and positioned relative to each other as discussed and shown herein.

As shown best in FIG. 4, splitter modules 28 are generally rectangular in shape having a right side surface 90, a left side surface 92, a front surface 94 and a rear surface 96. In general in the rectangular shaped embodiment of splitter modules 28 shown herein, right side surface 90 is substantially parallel to left side surface 92, and front surface 94 is substantially parallel to rear surface 96, and right side surface 90 and left side surface 92 are substantially perpendicular to both front surface 94 and rear surface 96. In various embodiments, right side surface 90 of splitter modules 28 in first row 44 face wall 20, and left side surface 92 of splitter modules 28 in first row 44 face the right side surface 90 of the adjacent splitter module 28 in second row 46. In this arrangement, left side surface 92 of splitter modules 28 in second row 46 face toward the center of interior compartment 26 of cabinet 10. As can be seen in FIG. 5, with the exception of the splitter modules at the ends of each row, the front surfaces 94 of each splitter module 28 face the rear surfaces 96 of adjacent splitter modules 28 within each row of splitter modules.

In general, in various embodiments, support system 42 includes a plurality of brackets 52 configured to support splitter modules 28 within cabinet 10. In one embodiment, support system 42 includes one bracket 52 for every two splitter modules 28 within second row 46. Further, using the tab and hole mounting configuration discussed above, additional splitter modules 28 and additional brackets 52 can be added to cabinet 10 without the use of complicated tooling or replacement of cabinet 10. Thus, the user of cabinet 10 can add new splitter modules 28 easily as additional users or customers are added to the optical networks served by cabinet 10.

In various embodiments, the walls of the cabinet 10 and the components of the splitter module support system 42 are formed from a rigid material and may be formed from a metal material, such as steel or aluminum or other suitably strong metal material. In one embodiment, splitter module support system 42 is formed from an aluminum material including an outer powder coating that can be colored as desired for a particular application.

Cabinet 10 and splitter module support system 42 can be used in conjunction with fiber distribution cabinets and splitter modules of a wide variety of sizes and designs. In one embodiment, cabinet 10 has height a between 40 inches and 60 inches, a width between 20 inches and 40 inches and a depth between 10 inches and 30 inches. In a specific embodiment, cabinet 10 has a height of 46 inches, a width of 26 inches and a depth of 19.3 inches. In various embodiments, splitter modules 28 have a height between 3 inch and 5 inches, a width between 1 inch and 2 inches and a depth between 0.5 inches and 1.5 inches. In one specific embodiment, splitter modules 28 have a height of 4.2 inches, a width of 1.7 inches and a depth of 0.9 inches. In another specific embodiment, splitter modules 28 have a height of 4.9 inches, a width of 2.5 inches and a depth of 0.9 inches.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A modular optical fiber distribution housing comprising:
    a plurality of walls, each of the plurality of walls including inner surfaces that together define an interior compartment of the housing;
    a first row of splitter modules supported from the inner surface of one of the plurality of walls, each splitter module of the first row configured to receive an input fiber and split a signal from the received input fiber into a plurality of output fibers; and
    a second row of splitter modules supported from the same inner surface of one of the plurality of walls as the first row of splitter modules, each splitter module of the second row configured to receive an input fiber and split a signal from the received input fiber into a plurality of output fibers;
    wherein the first row of splitter modules is located between the second row of splitter modules and the inner surface of the wall supporting the first and second rows of splitter modules.

2. The modular optical fiber distribution housing of claim 1 wherein the second row of splitter modules is spaced from the inner surface of the wall supporting the rows of splitter modules such that the perpendicular distance from the inner surface of the wall supporting the rows of splitter modules to a midpoint of one of the splitter modules of the first row is less than the perpendicular distance from the inner surface of the wall supporting the rows of splitter modules to a midpoint of one of the splitter modules of the second row.

3. The modular optical fiber distribution housing of claim 1 wherein the first row of splitter modules includes at least two splitter modules and the second row of splitter modules includes at least two splitter modules, wherein the first row of splitter modules is substantially parallel to the second row of splitter modules such that upper surfaces of the splitter modules of both the first and second rows are substantially coplanar with each other.

4. The modular optical fiber distribution housing of claim 1 wherein each splitter module includes a front surface, a rear surface parallel to the front surface, a left side surface and a right side surface parallel to the left side surface, wherein the right side surface of each splitter module of the first row faces the inner surface of the wall supporting the rows of splitter modules, wherein the left side surface of each splitter module of the first row faces the right side surface of the each splitter module of the second row, wherein the left side surface of each splitter module of the second row faces a center of the interior compartment.

5. The modular optical fiber distribution housing of claim 1 further comprising:
at least one support bracket including a back wall and a pair of arms extending from opposing sides of the back wall, each arm including a bracket tab; and
a mounting plate coupled to the inner surface of the wall supporting the rows of splitter modules, the mounting plate including a first array of openings extending through the mounting plate and a second array of openings extending through the mounting plate;
wherein each splitter module of the first row includes at least one tab engaged with an opening of the first array of openings such that the splitter modules of the first row are supported via the engagement between the tab and the opening of the first array of openings;
wherein the bracket tab of each arm engages an opening of the second array of openings such that the bracket is supported from the inner surface of the wall supporting the rows of splitter modules via engagement between the bracket tabs and the openings of the second array;
wherein the pair of arms of the bracket are located on opposing sides of at least one splitter module of the first row;
wherein the second row of splitter modules is supported from the back wall of the support bracket.

6. The modular optical fiber distribution housing of claim 5 wherein the at least one support bracket includes an opening formed through the back wall, wherein each splitter module of the second row includes at least one tab engaged with the opening formed in the back wall such that the splitter modules of the second row are supported via the engagement between the tab and the opening formed in the back wall of the support bracket.

7. The modular optical fiber distribution housing of claim 6 wherein the first array of openings comprises a plurality of horizontally positioned rectangular openings, and the second array of openings comprises a plurality of vertically positioned rectangular openings.

8. The modular optical fiber distribution housing of claim 7 wherein the first array includes a greater number of openings than the second array.

9. The modular optical fiber distribution housing of claim 1 wherein the volume of the interior compartment is less than 30,000 cubic inches, wherein the first row includes at least eight splitter modules and the second row includes at least eight splitter modules.

10. A modular fiber distribution cabinet comprising:
a plurality of walls, each of the plurality of walls including inner surfaces that together define an interior compartment of the cabinet;
a splitter module support system configured to support multiple rows of splitter modules along the inner surface of one of the plurality of walls, the splitter module support system comprising:
a plurality of support brackets including a back wall, a pair of arms extending from opposing lateral edges of the back wall, a bracket tab extending from each arm, and a support opening formed through the back wall; and
a mounting plate including a first array of openings extending through the mounting plate and a second array of openings extending through the mounting plate;
wherein each opening of the first array of openings is configured to engage a tab of a splitter module such that the splitter modules engaged with the first array of openings are supported from the mounting plate in a first row;
wherein the bracket tab of each arm of each support bracket are configured to engage an opening of the second array of openings such that each support bracket is supported from the mounting plate;
wherein the support opening of each support bracket is configured to engage a tab of a splitter module such that the splitter modules engaged with the support openings are supported from the support bracket in a second row.

11. The modular fiber distribution cabinet of claim 10 wherein the arms of the support bracket are substantially perpendicular to the back wall of the support bracket, and further wherein the bracket tabs extend from outer ends of the arms.

12. The modular fiber distribution cabinet of claim 11 wherein each support bracket includes a lower support wall extending outward from the back wall from the side opposite the arms, wherein an upper surface of the lower support wall is configured to engage a lower surface of the splitter module supported from the bracket.

13. The modular fiber distribution cabinet of claim 12 wherein the support opening of each support bracket is a substantially rectangular opening substantially parallel to an upper edge of the back wall.

14. The modular fiber distribution cabinet of claim 13 wherein the first array of openings comprises a plurality of horizontally positioned rectangular openings, and the second array of openings comprises a plurality of vertically positioned rectangular openings.

15. The modular fiber distribution cabinet of claim 14 wherein the second array of openings are positioned relative to the first array of openings such that, when the support brackets are supported from the mounting plate, the support openings of each support bracket are positioned at substantially the same height within the cabinet as the first array of openings.

16. The modular fiber distribution cabinet of claim 15 wherein an uppermost surface of each of the arms of the support bracket extend horizontally outward from the back plate at a position between the support opening and a vertical midpoint of the back plate, wherein the second array of openings of the support plate are located below the first array of openings.

17. The modular fiber distribution cabinet of claim 16 wherein the first array of openings are grouped into a repeating pattern of two or more openings in which a width of a portion of the support plate between the openings within each group is less than a width of a portion of the support plate between the last opening of one group of openings and the first opening of the next group of openings, wherein the openings of the second array are positioned vertically below the portion of the support plate between last opening of one group of openings and the first opening of the next group of openings.

18. The modular fiber distribution cabinet of claim 17 wherein the first array of openings includes at least ten separate openings, and the second array includes at least five separate openings.

19. A splitter module support system configured to support multiple rows of splitter modules along an inner surface of a fiber distribution cabinet, the splitter module support system comprising:
 a plurality of support brackets, each support bracket comprising:
  a back wall having an upper edge, a lower edge, a left edge, a right edge, a front surface and rear surface;
  a first arm extending from the left edge of the back wall away from and substantially perpendicular to the front surface of the back wall;
  a second arm extending from the right edge of the back wall away from and substantially perpendicular to the front surface of the back wall; and
  an upper support opening formed through the back wall extending in a direction from the left edge toward the right edge of the back wall and located vertically between the upper edge of the back wall and a midpoint of the back wall; and
 a mounting plate comprising:
  an upper edge;
  a lower edge;
  a horizontal middle axis located equidistance from the upper edge and the lower edge;
  a first array of openings through the mounting plate extending across at least a portion of the mounting plate and located vertically between the upper edge and the horizontal middle axis; and
  a second array of openings through the mounting plate located below the first array of openings;
 wherein each opening of the first array of openings is configured to engage an upper tab of a splitter module such that the splitter modules engaged with the first array of openings are supported from the mounting plate in a first row;
 wherein the first and second arms of each support bracket are each configured to engage a separate opening of the second array of openings such that each support bracket is cantilevered from the mounting plate;
 wherein the upper support opening of the support bracket is configured to engage an upper tab of a splitter module such that the splitter modules engaged with the upper support opening of the support bracket are supported from the rear surface of the support bracket.

20. The splitter module support system of claim 19 wherein the first array of openings comprises a plurality of horizontally positioned openings, and the second array of openings comprises a plurality of vertically positioned openings, wherein the first array of openings includes at least ten separate openings, and the second array includes at least five separate openings.

* * * * *